United States Patent [19]
Kvalheim

[11] Patent Number: 5,425,473
[45] Date of Patent: Jun. 20, 1995

[54] SCREW FEEDER

[75] Inventor: Andrew M. Kvalheim, Petaluma, Calif.

[73] Assignee: Kval, Inc., Petaluma, Calif.

[21] Appl. No.: 269,713

[22] Filed: Jul. 1, 1994

Related U.S. Application Data

[63] Continuation-in-part of Ser. No. 45,332, Apr. 8, 1993, Pat. No. 5,331,732, which is a continuation-in-part of Ser. No. 922,353, Jul. 29, 1992, Pat. No. 5,222,290, which is a continuation of Ser. No. 712,979, Jun. 10, 1991, abandoned.

[51] Int. Cl.$^6$ ............................................. B23Q 7/10
[52] U.S. Cl. ..................................... 221/188; 29/809; 221/289; 221/294
[58] Field of Search ............... 221/172, 188, 204, 289, 221/294; 29/771, 809, 813

[56] References Cited

U.S. PATENT DOCUMENTS

| | | | |
|---|---|---|---|
| 2,943,764 | 7/1960 | Haberstump | 221/68 |
| 4,222,495 | 9/1980 | Kaneko | 221/68 |
| 4,601,408 | 7/1986 | Billing et al. | 221/188 |
| 4,815,206 | 3/1989 | Jangaard | 29/809 |
| 4,993,588 | 2/1991 | Willberg et al. | 221/172 |

Primary Examiner—David P. Bryant
Attorney, Agent, or Firm—Corwin R. Horton

[57] ABSTRACT

A receptacle having a floor with parallel slots to receive and collate screws in a collating section and to queue them in a queuing section of the slots which has an intersecting escapement for depositing screw individually into receivers. The receptacle reciprocates to tip the slots downwardly in one slot direction and then the other. A retainer overlying the queuing section excludes loose screws and retains the queued screws in the slots during tipping. The retainer moves away from the slots when the receptacle is tipped downward toward the collating section to permit displaced screws to clear to the collating section. A gate at the leading edge of the retainer closes off the margin between the retainer and the floor to entry under the retainer of loose screws outside the slots. Screw conduits leading from the escapement reciprocate with the receptacle and connect with stationary receivers through articulations. Detents or recesses in the queuing sections detain the queues of screws from sliding away from the escapement when the receptacle is tipped downward in the direction away from the escapement.

19 Claims, 8 Drawing Sheets

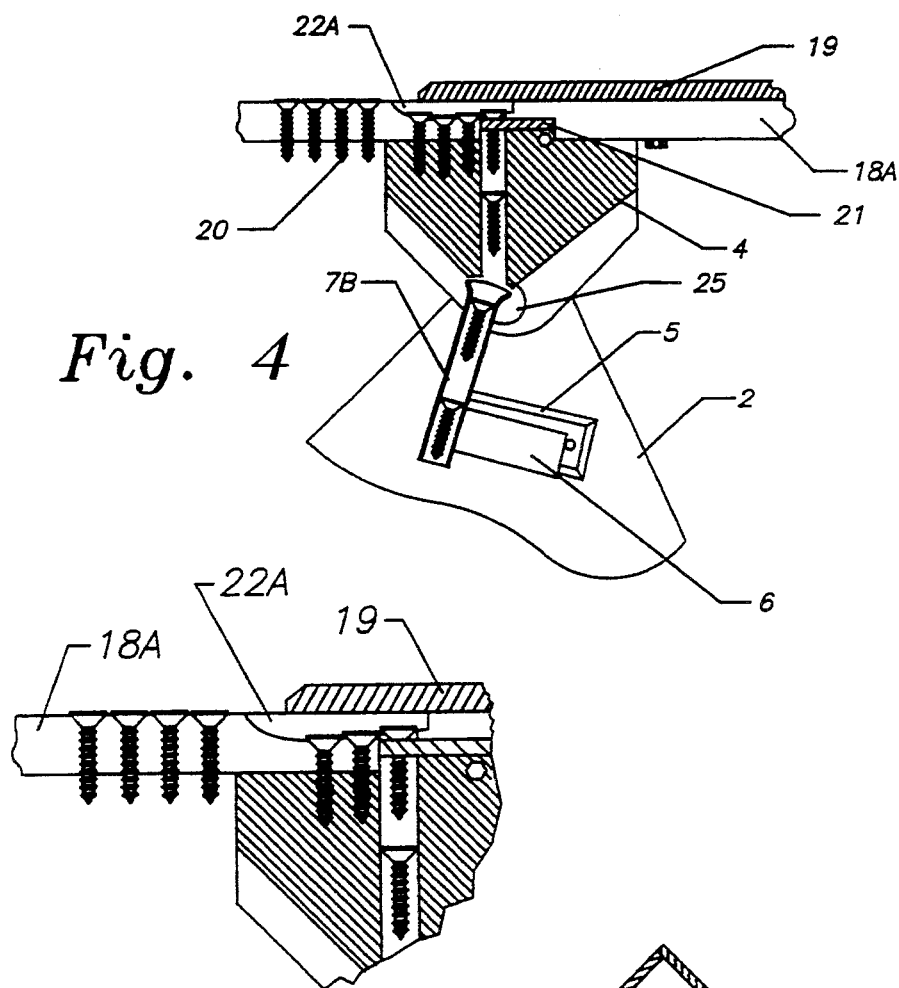
Fig. 4
Fig. 5
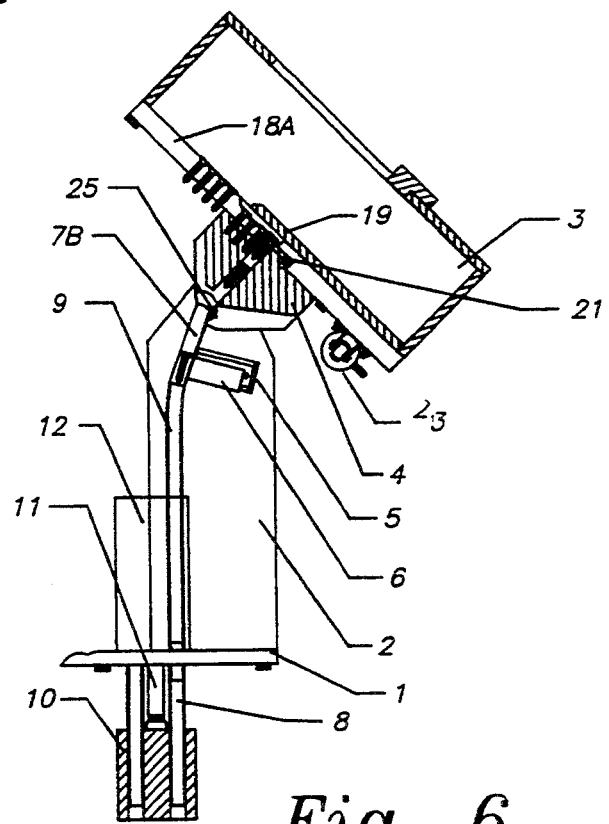
Fig. 6

Fig. 7
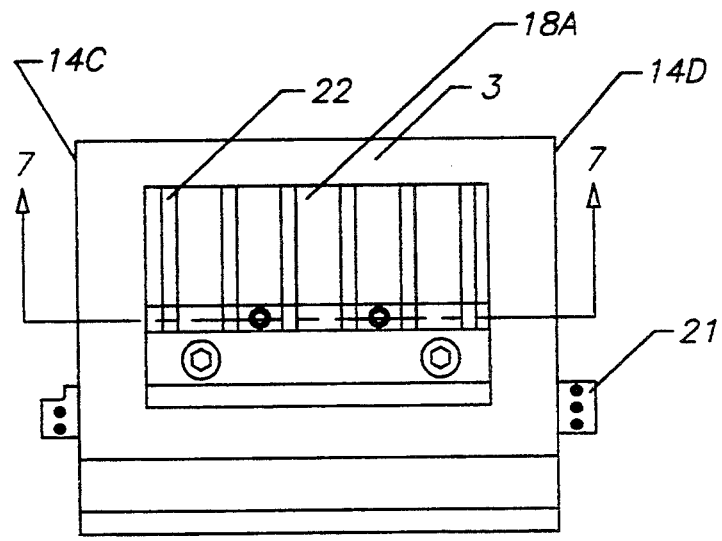
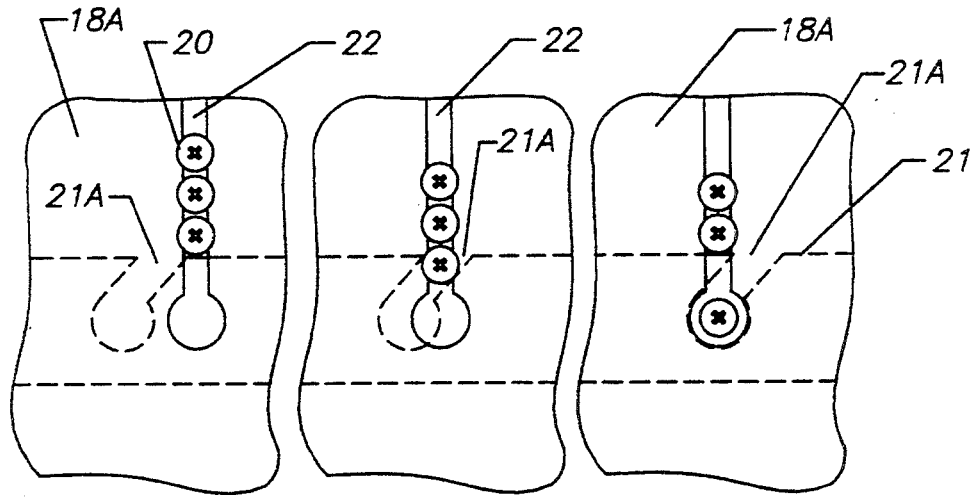
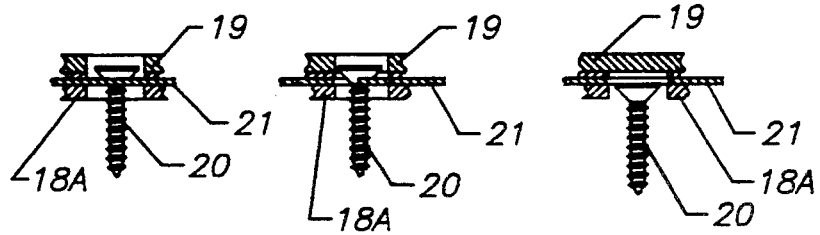

SCREW FEEDER

This is continuation-in-part of application Ser. No. 08.045,332, filed on Apr. 8, 1993, now U.S. Pat. No. 5,331,732, which is a continuation-in-part of application Ser. No. 07/922,353, filed on Jul. 29, 1992, now U.S. Pat. No. 5,222,290, which is a continuation of application Ser. No. 07/712,979, filed on Jun. 10. 1991, now abandoned.

BACKGROUND OF THE INVENTION

This invention relates to devices for collating and feeding screws, nails and other work articles of the same or similar configuration. Such feeders are utilized for supplying such articles to work stations where the articles may be further collated, transported or packaged or they may be used to carry out various operations such as fasten workpieces together, e.g. fastening hinges to door jambs.

Conventional screw feeders include devices such as those described in U.S. Pat. Nos. 2,943,764 and 4,222,495 which collate screws lying randomly in a receptacle by intercepting the screws with a collating device having one or more channels or slots into which the screws drop and which thus capture the screws in queued fashion. The screws are slidable within the slots so that when the slots are tilted above the horizontal about a pivot point at one end thereof, the queued screws will slide in the downhill direction. In this manner the screws are carried in each slot to the end of the slot at the pivot point. At the pivot point are entrances to a second set of slots which communicate with the respective first slots. The screws moving downward along the first slots will thus be transferred one-by-one, in a queue, into the second slots. The second slots are fixed and extend downwardly from their entrances so that the queue of screws will slide down the second slots to an escapement mechanism which will stop the queue and then separate each screw from the queue, consecutively depositing each screw into a receiver which transports each screw individually to an appropriate work station.

Screw feeders as described suffer from certain disadvantages due to the articulation required between the collating device and the receiving slots for the queued screws. An individual screw in the queue moving to the pivot point can become skewed. The skewed screw in the queue may not transfer properly to the receiving slot and instead become wedged at the junction between the slots, causing a plug of the slots. This requires a stoppage of the operation and manual clearing of the slot.

Additionally, in order to maintain the first set of slots in proper communication with the second set, particularly where the screw feeder is to be located in an industrial environment in which it will be subjected to rough treatment, possibly being hit by heavy objects, etc., strong and rigid construction is required, particularly at the pivot. This adds to the cost of construction and to supporting and operating the device due to its heaviness.

SUMMARY OF THE INVENTION

The invention relates to a device for collating screws or the like from a collection thereof lying at random and feeding individual screws to desired locations. The device constitutes a receptacle or box having a floor provided with slots for receiving screws from a collection of screws lying at random on the box floor. The received screws are collated by the slots in a collating section of the slots and, when the box is tipped, moves them into queues in a queuing section of the slots. The slots extend directly, without articulations therealong, to an escapement mechanism at the end of the queuing sections thereof for depositing them one-by-one from the queues into receivers.

The box is mounted for reciprocation about an axis so that the floor of the receptacle and the slots therein may be oscillated from a position at which the ends of the slots in the direction of the escapement mechanism are tipped below the horizontal and the end distant therefrom are above the horizontal to a position at which the ends of the slots in the direction of the escapement mechanism are above the horizontal and the end distant therefrom are below. The slots are recessed below the surface of the floor for a terminal portion of the queuing section up to the escapement. The recesses retain the queued screws in these sections from sliding back in the collating section when the slot is tilted downward in that direction. A shield or retainer overlies the recessed sections of the queuing sections of the slots, up to the escapement mechanism, to exclude the loose screws in the receptacle from the area overlying the slots in the vicinity of the escapement and to retain the queued screws from being displaced upwardly out of the slots as the box is tipped.

Screw feeding conduits are provided which have entrance apertures located in the receptacle below the slots at the escapement mechanism and oscillate therewith. Screws are individually dropped into the conduits from the slots by the escapement mechanism for transport by the conduits to a receiver. The conduits extend from the receptacle to the receiver, which is stationary in relation to the oscillating receptacle and are articulated therebetween.

In a further feature of this invention, detents are provided which engage the slots near the beginning of the queuing sections and spaced from the escapement to detain the queues of screws from sliding away from the escapement when the box is tipped downward in the direction away from the escapement. When the box reciprocates, tipping the box in the opposite direction, the detents disengage to permit additional screws received in the collating section of the slot to slide into the queuing section of the slots to add to the queues formed there.

In yet a further feature of the invention, the retainer overlying the queuing section of the slots is mounted for movement between a retaining and shielding position, where it is located when the box is tipped downward toward the queuing section from the collating section, and a disengaged position a distance above the slots when the box is tipped in the opposite direction. This permits any screws which may have become accidentally displaced from the slots in the queuing section to clear to the collating section during reciprocation.

BRIEF DESCRIPTION OF THE DRAWINGS

FIG. 4 is a partial sectional view taken along lines 4—4 of FIG. 3 but with the floor of the box shown in the horizontal position;

FIG. 5 is a blown-up fragmentary portion of the sectional view of FIG. 4 with some screws in the slot removed to see the configuration of the slot more clearly;

FIG. 6 is a complete view taken along lines 4—4 of FIG. 3, with box tilted as shown in FIG. 4;

FIG. 7 is a top view of the apparatus of FIGS. 1 through 6;

FIGS. 8A, 9A and 10A are each the same fractional portion of the top view of FIG. 7, at three sequential positions of the escapement bar, showing, respectively, the start position for moving a screw into the escapement bar notch, the start position for dropping a screw from the escapement bar into a receiver and the position for dropping one screw while holding back the remaining screws;

FIGS. 8B, 9B and 10B are each the same fragmentary cross-sectional view taken along lines 7—7 of FIG. 7 showing the escapement bar at the three sequential positions shown FIGS. 8A, 9A and 10A;

DETAILED DESCRIPTION OF THE PREFERRED EMBODIMENT

The following description illustrates the manner in which the principles of the invention are applied but is not to be construed as limiting the scope of the invention.

Figure 3:
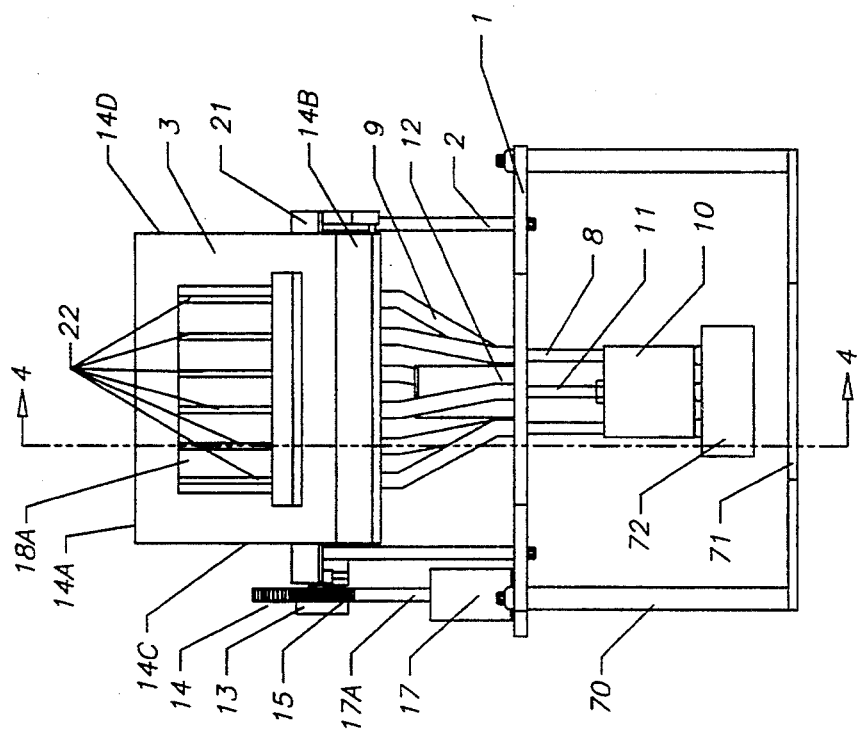
FIG. 3 is a face view of the apparatus of FIGS. 1 and 2.
Figure 2:
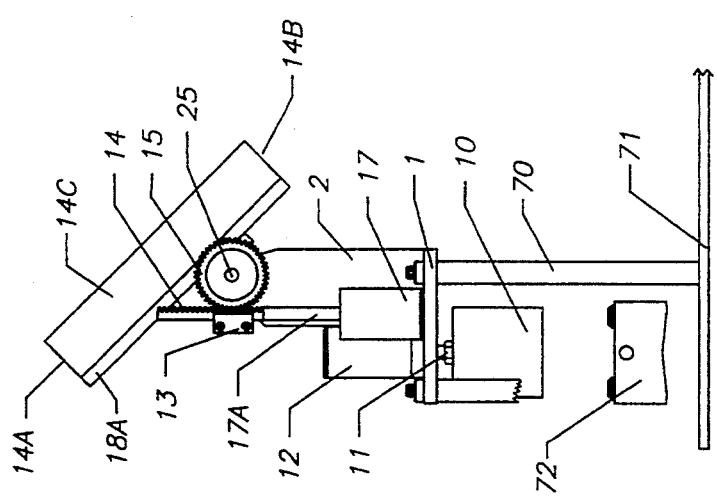
FIG. 2 is a is the same side view as FIG. 1, but a complete side view, showing the screw box tilted in the opposite direction.
Figure 1:
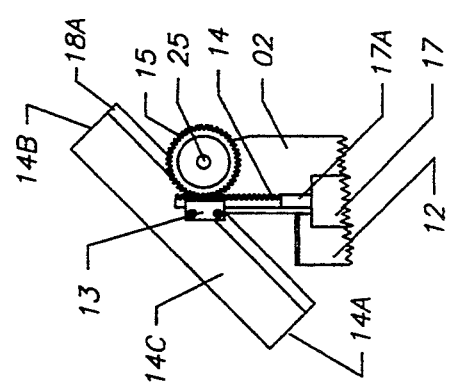
FIG. 1 is a partial side view of an embodiment of the screw feeder of the present invention.

Referring to FIGS. 1 through 6, a screw box or container 3 is mounted on upstanding brackets 2 for reciprocation as will be described. Brackets 2 are mounted on plate 1 which in turn is mounted on stanchions 70 fixed to a base 71. As best seen in FIGS. 5 and 6, floor plate 18A of screw hopper box 3 is fixed to screw escapement block 4 which extends across plate 18A below box 3. Escapement block 4 is mounted to brackets 2 through round shaft 25 and journals 24 for pivoting of the escapement block, and therewith box 3, around shaft 25. Referring now to FIGS. 1-3, box 3 is pivoted and actuated reciprocally by cylinder 17 attached rigidly to plate 1. Gear rack 14 is fastened to the end of cylinder rod 17A and reciprocates through ways 13 with gear 15 meshing the rack.

Box 3 has opposed endwalls 14A and 14B which are parallel with the axis of shaft 25. Attached to the ends of floor plate 18A are sidewalls 14C and 14D extending between the endwalls to form a hopper for screws that may be tilted from the horizontal about the axis of rotation around shaft 25 in either endwall direction. A series of parallel channels or slots 22 formed in bottom plate 18A extend from endwall 14A in the direction of endwall 14B parallel to sidewalls 14C and 14D and perpendicular to the axis of rotation of box 3 about shaft 25. Slots 22 are of a depth and width to receive a small work piece such as a screw in an upstanding position. In the case of a screw which has a head larger than the threaded section, the width of the slot accommodates the threaded section but is narrower than the diameter of the screw head so that the screws are held vertically in slots 22 with underside of the screwheads resting on plate 18 to each side of each slot 22.

Slots 22 extend in the direction of endwall 14B to an escapement bar 21 lying perpendicularly thereacross. Escapement bar 21 is slideable within bottom plate 18A at 90 degrees to slots 22, actuated by cylinder 23 as shown in FIG. 6.

Retainer plate 19 overlies floor plate 18A and slots 22 therein, beginning a distance in advance of escapement bar 21, and extends to endwall 14B. As best shown in FIGS. 4 and 5, beginning at the leading edge of plate 19 slots 22 are recessed with shoulders as shown at 22A so that the screws 20 drop down below the upper surface of plate 19 in advance of escapement bar 21. The margin at the beginning of recess 22A serves as a ledge or detent against which the trailing screw queued in the recess will lodge when the slot is tilted downward in the direction of the collating section, thereby preventing the screws queued in the recess from sliding back to the collating section. Thus, the screws in the recesses are retained in the ready to load position throughout the full cycle. Also, recesses 22A allow the screwheads to clear plate 19.

The section of slots 22 toward endwall 14A from retainer plate 19 are completely open to entry by screws sliding on floor plate 18A during reciprocation of the box and thus serve as a collating section for the screws. The section of slots 22 extending under retainer plate 19 are closed off from the screws sliding on plate 18A and thus serves as a protected section for queuing of the screws collated in the collating section of slots 22 and which slide down into the queuing section from the collating section when the box is tipped downward in the direction of end wall 14B.

Immediately below escapement bar 21 vertical screw receiving holes or conduits 7A extend downwardly through plate 18A and escapement block 4, immediately therebelow, at 90 degrees to slots 22. Escapement bar 21 lies in the paths formed by slots 22 below recesses 22A and has conventional escapement notches 21A at the side confronting slots 22 which are spaced therealong so a notch 21A will register with each slot 22 when escapement bar is appropriately positioned in its slidable direction. When so registered, a screw may advance into each notch and be dropped down a conduit 7A. When escapement bar 21 is slid out of register, it stops further movement of screws in the direction of endwall 14B in advance of conduits 7A.

Below each conduit 7A in escapement block 4 is a screw receiver 7B positioned with its mouth confronting a conduit 7A in escapement block 4 adjacent the axis of rotation of box 3 so that it will receive screws dropping down the conduit when the escapement is actuated. Screw receivers 7B are fixed in place by bar 6 engaged in block plates 5. A flexible tube 9 is slid tightly over each screw receiver 7B. Tubes 9 extend downwardly from receivers 7B to slidable connections with straight tubes or conduits 8 which are fixed in place by insertion through plate 1.

As shown in FIGS. 6, extendible block 10 below plate 1 slidably receives the ends of tubes 8 through cylindrical holes therein and is moveable vertically by cylinder rod 11 of cylinder 12 attached to plate 1. The block may thus be moved downward so that the cylindrical holes in the block extend a distance beyond the ends of tubes 8, thereby effectively extending the length of these conduits.

A receiving block 72 is movable to a mating position with extendible block 10 to receive screws dropping down through tubes 8 from box 3. Receiving block 72 is then used to take the screws to another location (not shown) for application thereof, such as for automatic application of hinges to doors and jambs utilizing the screws individually fed to block 72 from box 3.

Operation of the automatic collating and feeding apparatus proceeds as follows. The rotary reciprocating movement of box 3 causes the screws lying loosely therein to slide from one end to the other and randomly fall into slots 22 with the screws oriented in a generally heads up position.

As the box reciprocates to tip the box downwardly in the direction of the escapement bar from slots 22, the screws 20 that have entered slots 22 slide down by gravity toward the escapement bar, forming queues with the lead screw against the escapement bar. Escapement bar 21 is then actuated to pick off the lead screws at each slot one at a time and drop the screws down through screw escapement block 4 into screw receivers 7B.

Referring now to FIGS. 8A and 8B regarding this operation, with the endwall 14B of the box in the down position, the screws in slots 22 are queued with the lead screws against escapement bar 21 as shown. Escapement bar 21 is slid across slots 22, so that an escapement notch 21A moves into register with each slot 22. The lead screw moves into the slot by gravity and then falls through conduit 7A. The escapement bar continues to move until notches 21A are out of register with slots 22 thus holding back the other screws in the queue. When the box is reciprocated in the opposite direction so that slots 22 are downhill from escapement bar 21, it is then slid back to its initial position for beginning the next cycle.

As the box moves downwardly in the escapement direction at the beginning of a cycle, screws that have not entered slots 22 will slide over plate 19 and be retained at the downward end of the box. When the box then reciprocates to tilt the box in the opposite direction, these screws will move back to the other end of the box and again pass over slots 22. Thereupon, more of the loose screws will fall into the slots and the box will tip back in the direction of the escapement to repeat the cycle.

Screws queued immediately in advance of the escapement bar 21 will be retained by recesses 22A from sliding back to the collating section when the slots are tilted in that direction. Screws 20 queued in slots 22 toward the collating section from recesses 22A will remain in their slots as the box reciprocates in the opposite direction and simply slide to the opposite ends of slots 22. Then, when the box tilts back to lower the escapement end, these screws, together with additional screws that may drop into the slots, will slide back to join the queue resting against escapement bar 21 for repetition of the cycle.

Figure 11:
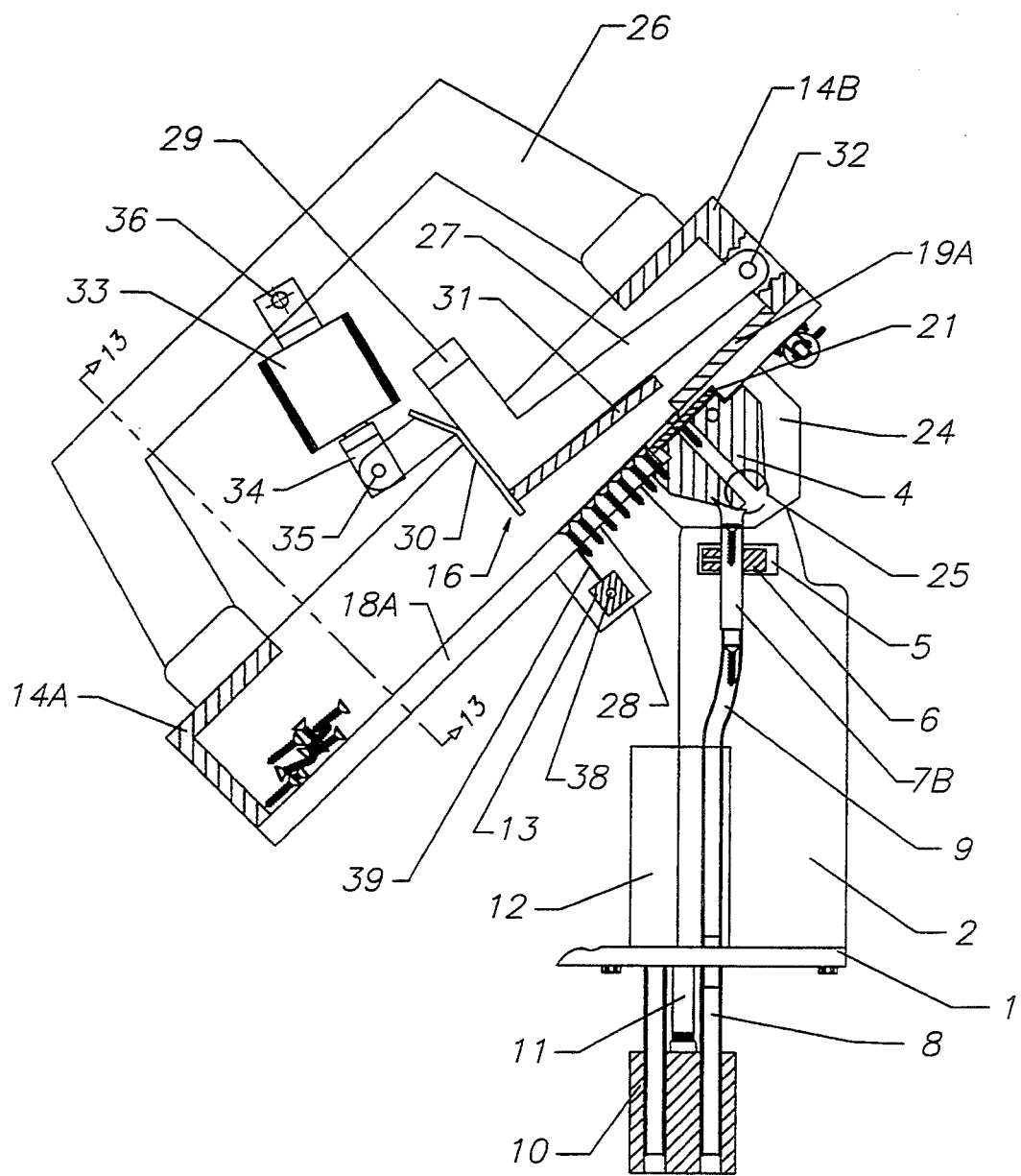
FIG. 11 is a partial cross-sectional view of the apparatus as in FIG. 6 but showing another embodiment of the invention which includes a screw retainer assembly in the engaged position.
Figure 12:
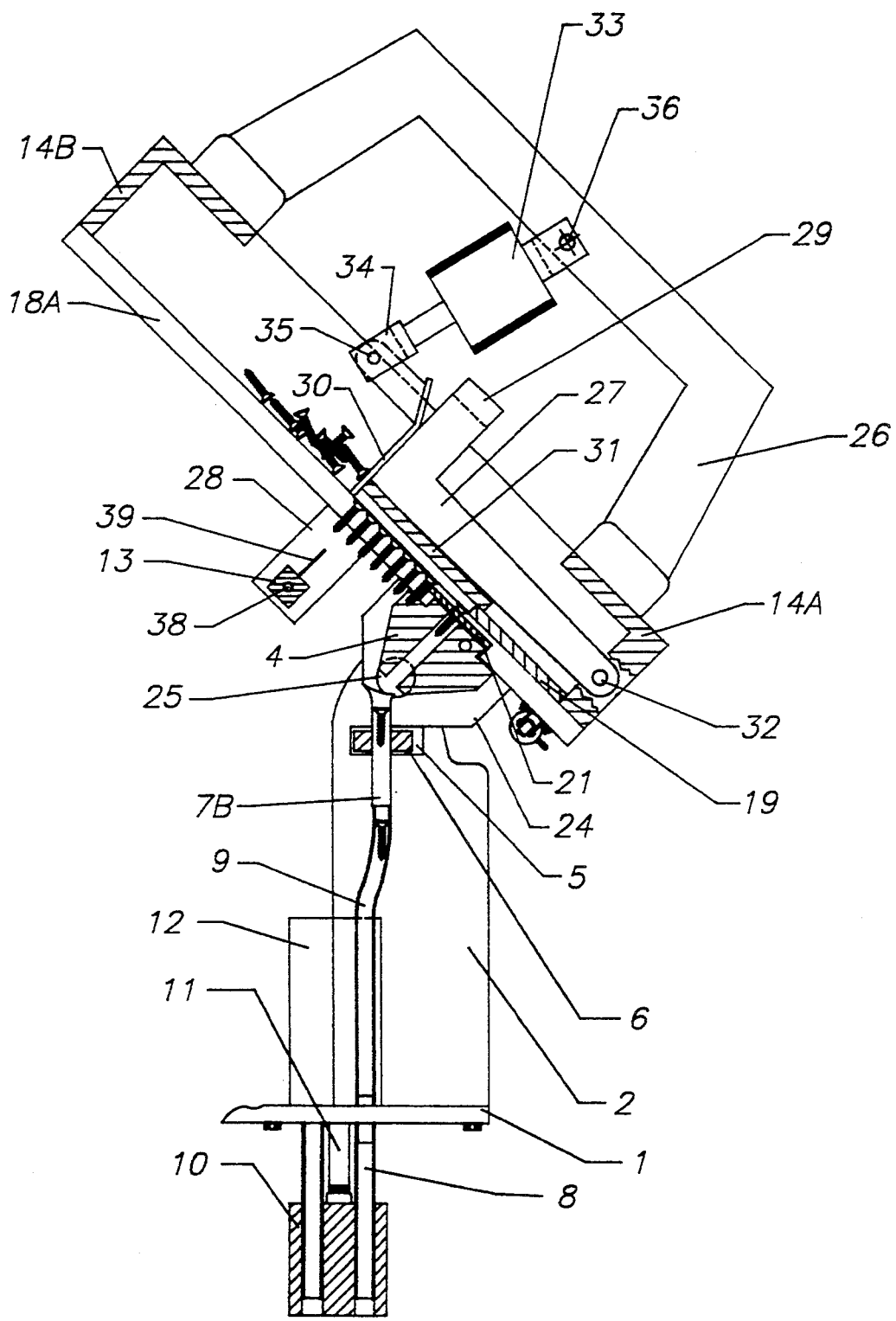
FIG. 12 is the same cross-sectional view of the apparatus of FIG. 11 but showing the screw box tilted in the opposite direction and the screw retainer assembly in the retracted position.
Figure 13:
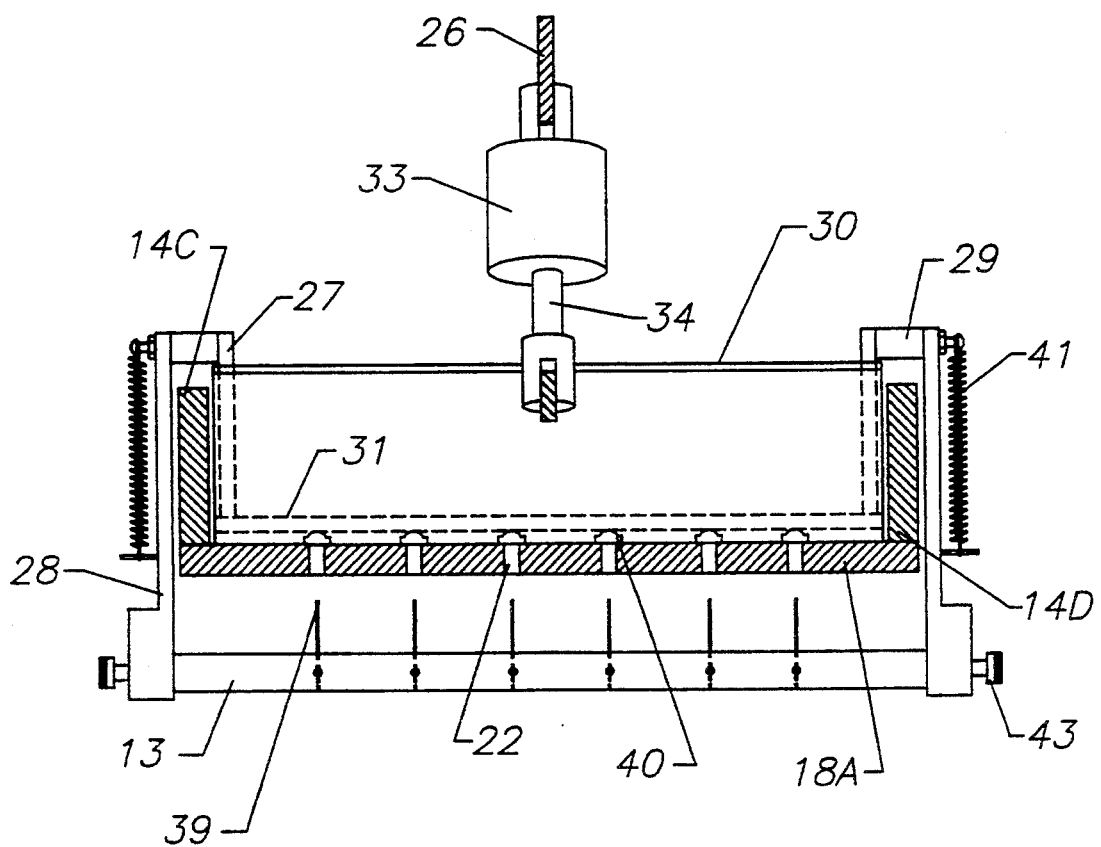
FIG. 13 is a cross-sectional view of the apparatus of FIGS. 11 and 12 taken along the lines 13—13 of FIG. 11.

Another and more preferred embodiment of the invention is shown in FIGS. 11–13. This apparatus and its operation is the same as for the first embodiment except for the design of the floor plate 18A, plate 19A and the provision of a retainer assembly generally indicated at 16. Assembly 16 has a retainer plate 31 extending across the width of floor plate 18A. A pair of side members 27 are disposed at the sides of floor plate 18A and each is attached thereto at its lower margin. Assembly 16 is pivotally mounted with the pivot at the ends of side members 27 at endwall 14B for pivoting between a lowered position with retainer plate 31 immediately above and parallel with floor plate 18A to a raised position with retainer plate 31 a distance above floor plate 18A. Retainer plate 31 in its lowered position abuts plate 19A which extends to endwall 14B and overlies plate 18A.

Gate 30 of assembly 16 is located over and across slots 22 a distance in advance of escapement bar 21. Gate 30 extends across box 22 and in the vertical direction extends a short distance below the lower margins of members 27 so that with assembly in the lowered position the lower margin of gate 30 rests against floor plate 18A. As seen in FIG. 13, small cutouts 40 are provided at the bottom margin of gate positioned to overlie slots 22 to provide clearance for the heads of screws in slots 22 to pass under gate 30.

Side members 27 each extend upwardly with their top margins above the top of sidewalls 14C and 14D when assembly 16 is at the lowered position and each is secured to a bridge member 29 which extends to the outside of box 3 over the sidewall 16 adjacent to the side member to which it is secured. An arm 28 is attached to the outside end of each bridge member 29 and extends downwardly to a position below floor plate 18A of box 22 at which an end of bar 13 is attached. Bar 13 is mounted to arms 28 through bearings 38 for rotation by means of knob 43 for maintenance purposes. Bar 13 extends underneath box 3 transversely to slots 22 at a position below slots 22 a distance in advance of escapement bar 21. Rigid wire fingers 39 on bar 13 extend upwardly toward floor 18A and are positioned along bar 13 to register with slots 22 for restraining screws from movement along slots 22. When assembly 16 is in the raised position, as shown in FIG. 11, fingers 39 extend into slots 22 at a longitudinal position in advance of escapement bar 21. When assembly 16 is in the lower position fingers 39 are below floor 18A and disengaged from slots 22.

Air cylinder 33 is provided for operating assembly 16, moving it between the raised and lowered positions. Air cylinder 33 is pivotally mounted through bearing 36 on support frame 26 which, in turn, is fixed to endwalls 14A and 14B of box 22. The cylinder rod of air cylinder 33 is fitted with clevis 34 which is pivotally mounted to gate 30 through bearing 35 on a flange extension of gate 30. A tension spring 41 is connected between each side members 27 of assembly 16 and a respective side wall of box 22 to bring the assembly to the lower position in the event of air pressure loss.

In operation, when the box is reciprocated downwardly in the direction of the escapement, cylinder 33 is actuated to move assembly 16 to the lower position with gate 30 closing off the box. This brings retainer plate 31 immediately over escapement bar 21 and the adjacent portions of slots 22, thereby to help retain screws 20 in slots 22 while the box is tipped towards the escapement. Closure of gate 30 prevents loose screws in the box sliding sideways under retainer plate 31 and possibly plugging up slots 22. With assembly 16 in the lower position fingers 39 are disengaged from slots 22 so that the queues of screws are free to move toward the escapement along the entire lengths of slots 22.

When the box is reciprocated to tip the box in the opposite direction, cylinder 33 is actuated to raise assembly 16 to the raised position. Thereby, fingers 39 are moved into slots 22 to retain the queue of screws extending toward the escapement from sliding away from their ready loading position at the escapement. This also leaves slots 22 in the downward direction at least partially clear to receive additional screws. With assembly 16 in the raised position both gate 30 and retainer plate 31 are raised above slots 22 so that any screws which have been accidentally displaced from the slot will be cleared to the collating section.

Figure 14:
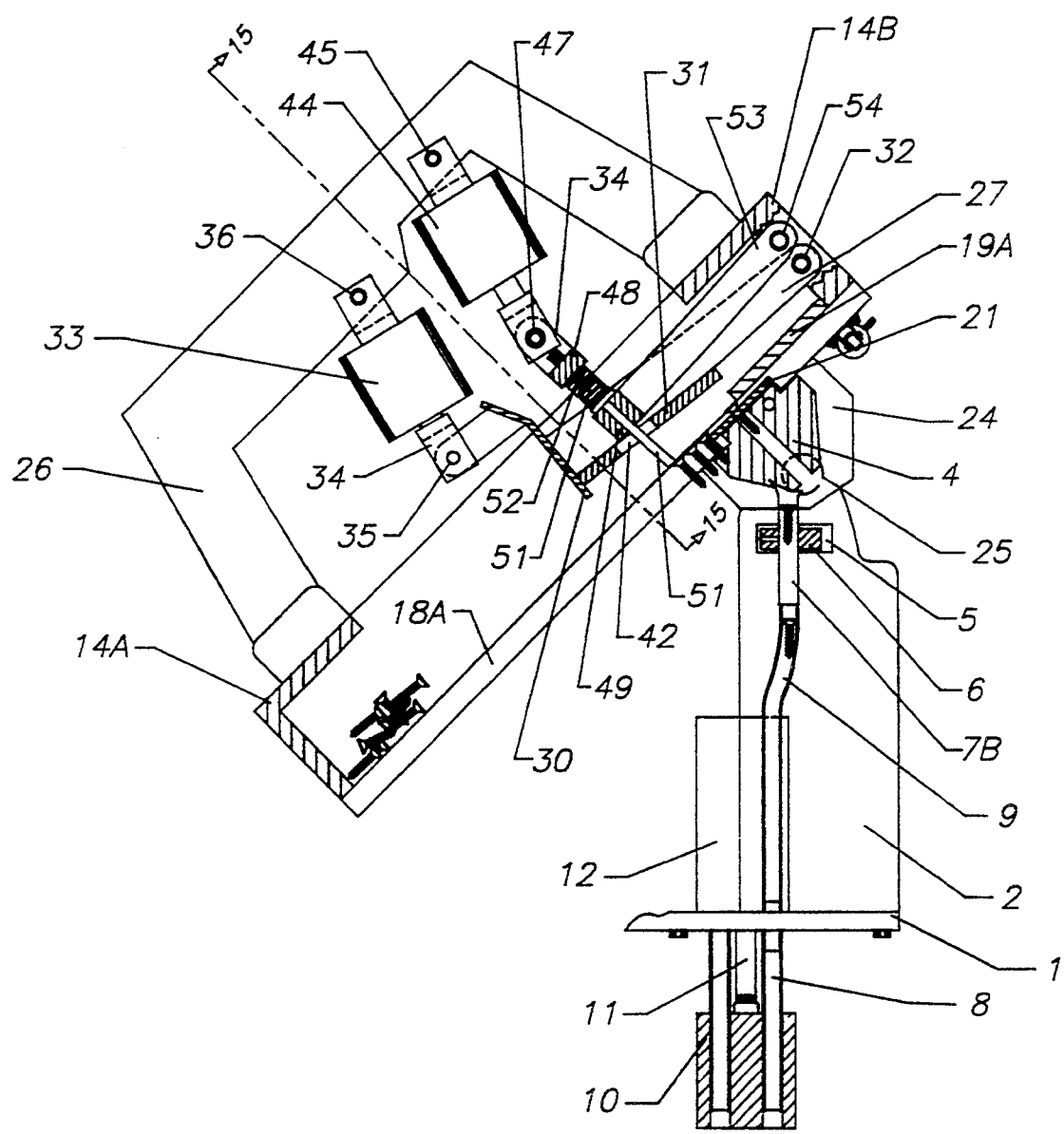
FIG. 14 is a partial cross-sectional view of the apparatus as in FIG. 6 but showing yet another embodiment of the invention which includes a modified screw retainer assembly in the engaged position.
Figure 15:
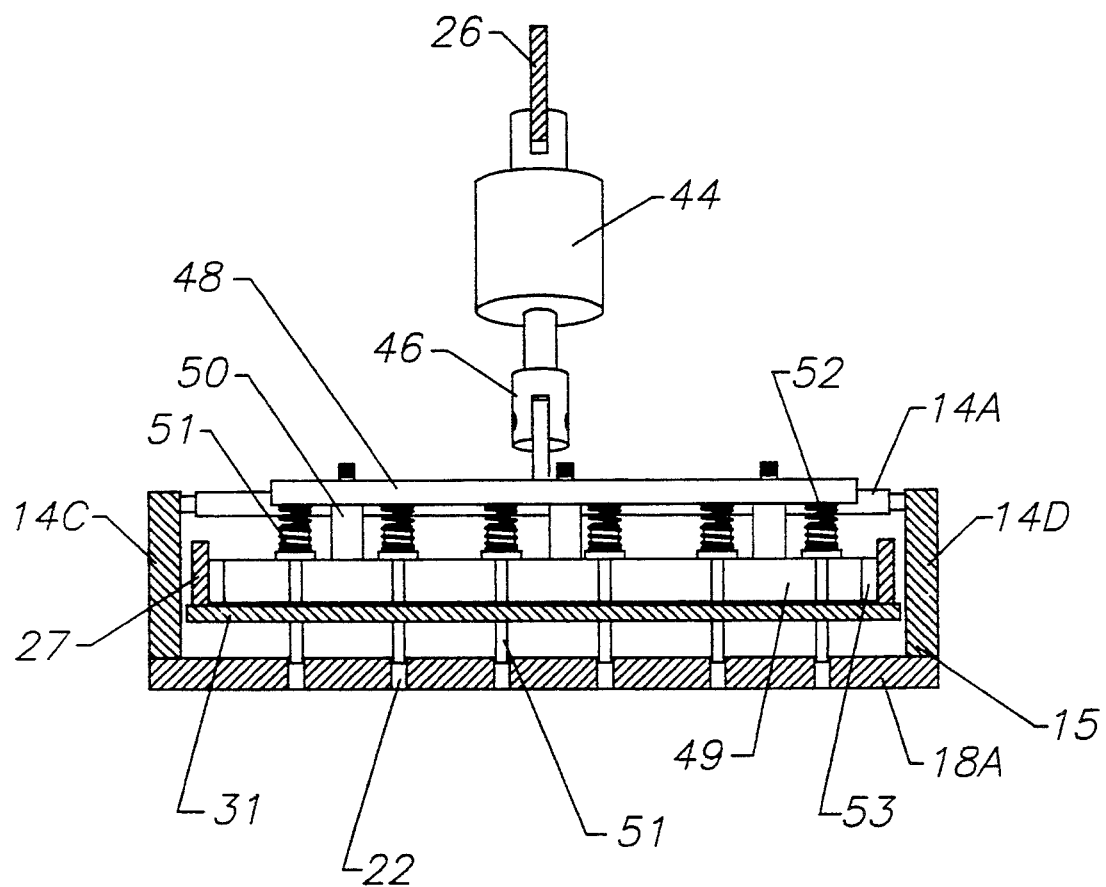
FIG. 15 is a cross-sectional view of the apparatus of FIGS. 14 taken along the lines 15—15.

Yet another embodiment is shown in FIGS. 14 and 15. This embodiment is the same as that of FIGS. 11-13 except that, in place of restraining fingers 39 inserted into slots 22 from below, detent rods 51 are positioned above slots 22 a distance in advance of escapement bar 21 for engagement with the tops of heads of screws 20 to restrain their movement along slots 22. Detent rods 51 are slidably received in a mounting block 49 extending across slots 22 and have enlarged head extending above mounting block 49. Mounting block 49 is attached to a pair of pivot arms 53, one adjacent each of sidewalls 14C and 14 D. Pivot arms 52 each pivots about a respective bearing 54 secured to endwall 14B. A compression spring 52 is positioned above each of the enlarged heads of rods 51 to urge rods 51 downwardly with their heads resting against the top of block 49. Bar 48 secured to block 49 holds compression springs 52 in place. A flange extension 34 secured to bar 48 is pivotally mounted to clevis 46 fitted on the operating rod of cylinder 44. Cylinder 44 is pivotally secured through a bearing to support frame 26.

Holes 42 are provided through retainer plate 31 in register with detent rods 51 so that each rod 51 extends towards plate 18A through a hole 42. Pivot arm 53 is movable by cylinder 44 from a raised position, at which detent rods 51 are raised above floor 18A and are distant from slots 22, to a lowered position, at which the end of each detent rod is at a slot 22 and resting against the head of any screw queued in the slot at that position.

Retainer assembly 16 in this embodiment operates in the same fashion as in the embodiment of FIGS. 11-13 with respect to gate 30 and retainer plate 31. However, in this embodiment detent rods 51 are operated separately from assembly 16. Specifically, when the box is reciprocated downwardly in the direction of the escapement, cylinder 44 is actuated to move detent rods 51 to the raised position with the ends of rods 51 disengaged from slots 22 so that the queues of screws are free to move toward the escapement along the entire lengths of slots 22.

When the box is reciprocated to tip the box in the opposite direction, cylinder 44 is actuated to lower rods 51 to the lowered position. Thereby, rods 51 are moved to slots 22 and in contact with the heads of screws queued there, so as to retain the queue of screws extending toward the escapement from sliding away from their ready loading position at the escapement.

I claim:

1. An automatic screw feeder comprising a container for receiving screws in random orientation having a floor with a screw receiving slot extending along the floor, said slot having a screw collating section thereof and an adjacent screw queuing section thereof, means for mounting said container for tilting said floor downward from the horizontal reciprocally in either direction along said slot, a screw escapement located at an end of the screw queuing section remote from the collating section for isolating individual screws and dropping them downwardly from the slot, a screw receiver below said escapement for receiving the individual screws dropped by the escapement and a retainer overlying said queuing section of said slot, said retainer spaced sufficiently close to the slot to inhibit movement of the queued screws upwardly out of the slot but with sufficient clearance space to permit movement of screws along said slot.

2. A screw feeder as in claim 1 and including means for detaining the queued screws in the queuing section from sliding back toward the collating section when the slot is tilted downward toward the collating section.

3. A screw feeder as in claim 2 and wherein said detaining means comprises a recess extending from an end portion of said collating section immediately adjacent said queuing section to said screw escapement.

4. A screw feeder as in claim 2 and wherein said detaining means comprises a detent movable between (a) an engaged position at the slot in detaining contact with screws in the slot at a location therealong in said queuing section spaced from said escapement toward the collating section and (b) a disengaged position remote from the slot and means to move the detent to the engaged position when the collating section is tilted downwardly frown the queuing section and to the disengaged position when the queuing section is tilted downwardly from the collating section.

5. A screw feeder as in claim 4 and wherein the disengaged position of said detent is a position spaced below the floor of the container and wherein said detent is moved upwardly from the disengaged position to an engaged position at the slot.

6. A screw feeder as in claim 4 and wherein the disengaged position of said detent is a position spaced above the floor of the container and wherein said detent is moved downwardly from the disengaged position to an engaged position at the slot.

7. A screw feeder as in claim 1 and including a gate over said floor and extending over the slot at a margin of the retainer facing the collating section and across the space between the retainer and floor to exclude screws from movement into a region of the container above the queuing section.

8. A screw feeder as in claim 7 and wherein said gate is moveable between an exclusionary position abutting the floor and a raised position above said floor and including means for moving the gate from the raised position to the exclusionary position when the queuing section is tilted downwardly from the collating section and from the exclusionary position to the a raised position when the collating section is tilted downwardly from the queuing section.

9. A screw feeder as in claim 1 and wherein said retainer is moveable to a disengaged position distant from the slot and including means for moving the retainer to the disengaged position when collating section is tilted downwardly from the queuing section and for returning the retainer to its position close to the slot when the queuing section is tilted downwardly from the collating section.

10. A screw feeder as in claim 1 and wherein said floor has a plurality of said screw receiving slots in parallel.

11. A screw feeder as in claim 1 and including a conduit connecting with said container below the slot at the escapement and reciprocating therewith for receiving individual screws dropped therefrom, said conduit being in screw transport communication through an articulation with a screw receiver remote from the container and not reciprocating therewith.

12. An automatic screw feeder comprising a container for receiving screws in random orientation having a floor with a screw receiving slot extending along the floor, said slot having a screw collating section thereof and an adjacent screw queuing section thereof, means for mounting said container for tilting said floor downward from the horizontal reciprocally in either direction along said slot, a screw escapement located at an end of the screw queuing section remote from the collating section for isolating individual screws and dropping them downwardly from the slot, a screw receiver below said escapement for receiving the individual screws dropped by the escapement and a detent movable between (a) an engaged position at the slot in detaining contact with screws in the slot at a location therealong in said queuing section spaced from said escapement toward the collating section and (b) a disengaged position remote from the slot and means to move the detent to the engaged position when the collating section is tilted downwardly from the queuing section and to the disengaged position when the queuing section is tilted downwardly from the collating section.

13. A screw feeder as in claim 12 and wherein the disengaged position of said detent is a position spaced below the floor of the container and wherein said detent is moved upwardly from the disengaged position to an engaged position at the slot.

14. A screw feeder as in claim 12 and wherein the disengaged position of said detent is a position spaced above the floor of the container and wherein said detent is moved downwardly from the disengaged position to an engaged position at the slot.

15. An automatic screw feeder comprising a container for receiving screws in random orientation having a floor with a plurality of screw receiving slots extending along the floor, said slots having a screw collating section thereof and an adjacent screw queuing section thereof, means for mounting said container for tilting said floor downward from the horizontal reciprocally in either direction along said slots, a screw escapement located at an end of the screw queuing sections remote from the collating sections for isolating individual screws and dropping them downwardly from the slots, screw receivers below said escapement for receiving the individual screws dropped by the escapement from each slot, a retainer overlying said queuing sections of said slots, said retainer spaced sufficiently close to the slots to inhibit movement of the queued screws upwardly out of the slots but with sufficient clearance space to permit movement of screws along said slots and detents registering with the slots and movable between (a) engaged positions at the slots in detaining contact with screws in the slots at a location therealong in said queuing section spaced from said escapement toward the collating sections and (b) disengaged positions remote from the slots and means to move the detents to their engaged positions when the collating sections are tilted downwardly from the queuing section and to their disengaged positions when the queuing sections are tilted downwardly from the collating sections.

16. A screw feeder as in claim 15 and including a gate over said floor and extending over the slots at a margin of the retainer facing the collating sections and across the space between the retainer and floor to exclude screws from movement into a region of the container above the queuing sections.

17. A screw feeder as in claim 16 and wherein said gate is moveable between an exclusionary position abutting the floor and a raised position above said floor and including means for moving the gate from the raised position to the exclusionary position when the queuing sections are tilted downwardly from the collating sections and from the exclusionary position to the a raised position when the collating sections are tilted downwardly from the queuing sections.

18. A screw feeder as in claim 15 and wherein said retainer is moveable to a disengaged position distant from the slots and including means for moving the retainer to the disengaged position when the collating sections are tilted downwardly from the queuing sections and for returning the retainer to its position close to the slots when queuing sections are tilted downwardly from the collating sections.

19. A screw feeder as in claim 15 and including a conduit connecting with said container below each slot at the escapement and reciprocating therewith for receiving individual screws dropped therefrom, each conduit being in screw transport communication through an articulation with a screw receiver remote from the container and not reciprocating therewith.

* * * * *